Aug. 25, 1964 N. W. BURKE 3,146,430

ELECTRICAL APPARATUS FOR MONITORING A RECORD TAPE

Filed Oct. 31, 1961 2 Sheets-Sheet 1

INVENTOR.
NELSON W. BURKE
BY [signature]
ATTORNEY

INVENTOR.
NELSON W. BURKE
BY Henry L. Hanson
ATTORNEY 3,146,430

ELECTRICAL APPARATUS FOR MONITORING A RECORD TAPE

Nelson W. Burke, Stoneham, Mass., assignor to Minneapolis-Honeywell Regulator Company, Minneapolis, Minn., a corporation of Delaware Filed Oct. 31, 1961, Ser. No. 148,983
12 Claims. (Cl. 340—174.1)

A general object of the present invention is to provide a new and improved apparatus for defining the length of a record of information used in a data processing apparatus. More specifically, the present invention is concerned with a new and improved apparatus for sensing the length of a record stored in a movable data storage medium which is characterized by its ability to accurately define the limits of a record in terms of the signals normally associated with the presence of a record on the storage medium.

In certain types of data processing systems, large quantities of data are stored on data storage tapes which may well take the form of magnetic storage tapes. In the course of writing information on such a tape, it may be desirable to arrange the writing operation such that when a write signal is received from the utilization circuitry, the recording mechanism will initiate the recording of a series of clock pulses or sprocket pulses along a particular channel on the tape. Following the recording of one or more of such clock pulses, informational data will be recorded in synchronism with the recording of the clock pulses. The amount of data which is recorded is generally directly related to the length of a particular record of information which may be comprised of several alphanumeric characters. As soon as the information recorded has been finished, a further selected number of clock signals may be recorded and then the clock signal source will be deactivated. With such a recording scheme, it will be seen that a digital record formed on the tape will be defined at its beginning and end by the presence of clock pulses.

In certain types of data processing circuitry, the reading of a digital record from a storage tape necessitates that appropriate signals be generated to indicate when the associated mechanism has started reading a tape and when the record which is to be read has been completed. The present invention is concerned particularly with an apparatus useful in defining when a record is being read from a data tape. In its elemental form, the present invention comprises a circuit which is adapted to be set to a predetermined state as long as clock signals are being received from the tape. When the clock signals cease, the circuit automatically resets to a second state after a predetermined period of time.

It is accordingly a further more specific object of the present invention to provide a length of record detector which comprises a circuit means adapted to be switched to a predetermined state so long as a continuous train of clock signals are received on the input of the circuit.

Once the beginning of a record has been detected, it may be desirable to provide a means for maintaining the record detector in the set state by means other than the clock signal. Consequently, once the record detector has been switched to a set state, means may be provided as described herein for holding it in the set state by way of signals that may be derived from any of the other channels on the tape. This means that there will not be a dropout or resetting of the record detector in the event that a clock signal should not be sensed.

It is therefore a still further more specific object of the invention to provide a new and improved apparatus for sensing the length of a record on a data storage tape wherein once the record detector has been previously set by the sensing of a clock signal it may thereafter be maintained in a set state by data signals derived from the information read from the tape.

In certain forms of the invention, and particularly wherein the record being read is associated with a tape which may be read in either a forward or reverse direction as well, as a tape which may be started and stopped, it is necessary to provide control signals which may be utilized to recognize the particular control operation being performed relative to the tape. Thus, in connection with the reading of clock signals from the tape, it is necessary to provide a specialized circuit for recognizing the fact that the phasing of the clock signal when read in the forward direction may well be opposite that when the tape is read in the reverse direction. Consequently, special gating means are provided for selectively sensing the output of an associated signal-shaping circuit to compensate for the direction that the tape may be moving. In connection with a tape that is being started or stopped relative to each record, further compensating means must be provided for controlling the input gates relative to initially delaying the response of the record detector following a drive signal to the tape-moving mechanism.

A still further object of the invention is then to provide a new and improved record detector for a movable data storage tape wherein the record detector includes means for selectively responding to the presence of the record on the tape as well as means for selectively responding to signals indicative of the motion of the tape relative to a record-sensing means.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there are illustrated and described a preferred embodiment of the invention.

Figure 1:
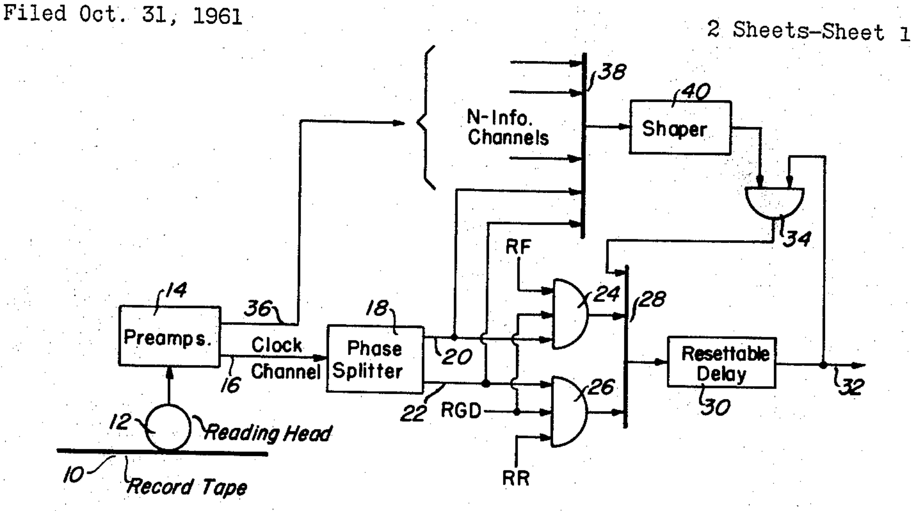
FIGURE 1 is a diagrammatic representation of the principal elements utilized in the present invention.

Referring to FIGURE 1, there is here illustrated the logical arrangement of the principal elements of the invention arranged to effect the purposes and objects outlined above. The apparatus is arranged to operate in conjunction with any type of record storage medium. For purposes of explanation herein, it is assumed that the storage medium takes the form of a magnetic tape 10 which has recorded in a plurality of channels informational data and a synchronizing or clock signal recorded on a further channel. An appropriate data reading head 12 is provided for sensing the presence of data and clock signals stored in the record tape 10 and passing these signals through appropriate preamplifier circuitry 14 to utilization circuitry, not shown, as well as the present record detector circuit illustrated in FIGURE 1.

The clock channel output from the preamplifier circuitry 14 appears on the output line 16 and is arranged to be fed into an appropriate phase splitter 18 which functions to produce an output pulse uniquely identifying the presence of a clock signal from the clock channel on the tape 10. The outputs from the phase splitter 18 will appear alternately on one or the other of two output lines 20 or 22 depending upon the phase of the input signal which is a function of the direction in which the tape is moving relative to the reading head 12.

The signal on the line 20 is arranged for application to an AND gate 24 having three input gate legs. The output signal on a line 22 is arranged for application to a further AND gate 26, the latter also having three input gate legs. One of the input signals applied to the AND gate 24 will be a read forward signal RF which may be derived from means, not shown, which indicates that a read forward operation is being performed. Also applied to the input of the AND gate 24, as well as the AND gate 26, is a read gate delay signal RGD. This latter signal may be generated by means, not shown, for temporarily deactivating the AND gates 24 and 26 when the record tape is not moving and for a predetermined period after a read signal has been initiated to start a movement of the tape. The RGD signal ensures that noise signals or unwanted signals which may be associated with a tape start will not adversely affect the indicating function performed by the present record detector.

The outputs of the gates 24 and 26 are buffered together on a buffer circuit or OR gate 28 which is illustrated with three inputs, two of which are derived from the AND gates 24 and 26.

The output of the buffer 28 is connected to the input of a resettable delay circuit 30. This resettable delay circuit may take the form of a monostable multivibrator or other similar device, as is illustrated and discussed below, which is adapted to be set by an input signal to a first state and then, following a predetermined time, automatically reset to a second state. The output of the resettable delay circuit 30 is arranged for connection to an output lead 32 which will indicate when the circuit 30 is set. When set, it indicates that a record is present under the reading head 12. The output line 32 is also connected to an input gate leg of a further AND gate 34. The output of the AND gate 34 is connected to a further input buffer line on the buffer 28.

A further output from the preamplifier circuitry 14 is by way of the coupling means 36 which couples the output on each information channel to a separate input line on a further OR gate or buffer 38. The output of the buffer 38 is connected by way of the pulse-shaper circuit 40 to a further input gate leg on the AND gate 34.

Figure 2:
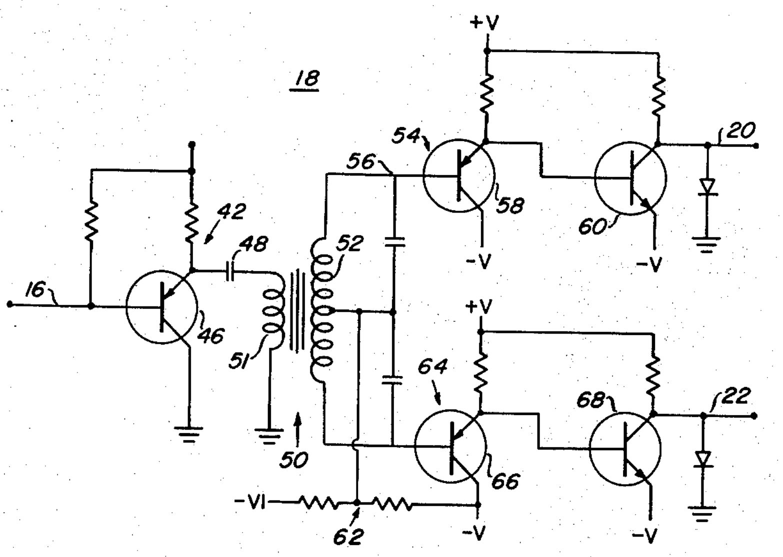
FIGURE 2 is a schematic drawing of a phase-splitting network used in the invention.

Referring next to FIGURE 2 there is here illustrated the schematic detail of a preferred form of clock signal phase splitter. In this figure, the input to the phase splitter takes the form of an emitter-follower transistor circuit 42 having the input line 16 which is connected to the base of the transistor 46. The output of the emitter follower is connected by way of a condenser 48 to the input of a step-up transformer 50 having a primary winding 51 and a center tapped secondary winding 52. In one embodiment, the step-up ratio between the primary 51 and the secondary 52 was 2 to 1 so that, in effect, the signal amplitude from the center tap to one end of the secondary was the same as the signal on the primary. The signal from the upper end of the secondary 52 is coupled to the input of a further emitter-follower transistor stage 54 having an input at 56 which is connected to the base of a transistor 58. The output, by way of the emitter of the transistor 58, is coupled directly to the input base of a further transistor 60. The transistor 60 is biased to be normally in the cut-off state.

The circuit also includes a special signal level control circuit 62 which is arranged for connection to the center tap on the secondary 52. This threshold control circuit connects as a bias input for the emitter-follower circuit 54 so that this circuit will not be effective to pass a signal therethrough until such time as the signal threshold has been exceeded. The circuit of FIGURE 2 also includes a further pulse-forming network comprising an emitter-follower circuit 64 including a transistor 66. The output of the transistor 66 is coupled to a further transistor 68 which is normally biased to be nonconducting.

Figure 3:
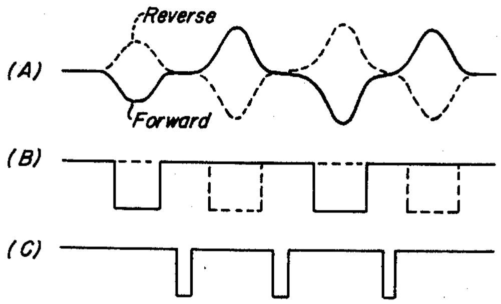
FIGURE 3 shows illustrative waveforms associated with the output of the phase splitter and information channels as used in the invention.

In operation, the apparatus of FIGURE 2 is arranged so that the input clock signal, which may take the form represented at FIGURE 3A, will pass through the input stage 42 through the transformer 50 to the inputs of the emitter-follower circuits 54 and 64. Depending upon whether the tape record is being read in the forward or reverse direction, one or the other emitter-followers, 54 or 64, will be rendered nonconducting when the signal level exceeds the threshold signal level and their outputs coupled to the normally cut-off transistors 60 or 68 to produce the negative-going output pulses represented in FIGURE 3B. These output pulses will be available for application to the output leads 20 and 22 which are connected to the AND gates 24 and 26 respectively, of FIGURE 1.

Figure 4:
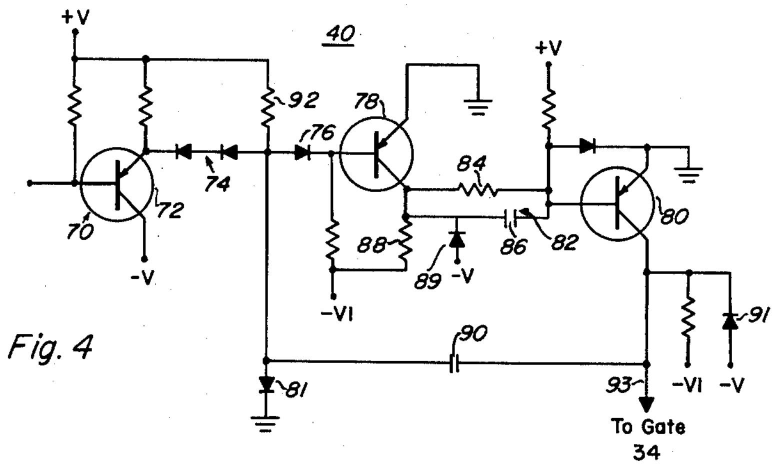
FIGURE 4 is a schematic representation of the wave shaper associated with the information channels.

The pulse-shaping circuitry of FIGURE 4 is arranged to receive the clock or information signals from the buffer circuit 38 of FIGURE 1. The input of this pulse-shaping circuit takes the form of an emitter-follower circuit 70 including a transistor 72. The output of the emitter-follower circuit is by way of a pair of diodes 74 and a further diode 76, the latter of which is connected to the input of the transistor 78. The transistor 78 is connected in a grounded emitter circuit configuration and is biased, in the quiescent state, to be nonconducting by way of the clamp voltage which exists across a diode 81. The output of the transistor 78 is coupled to the input of a further transistor 80 which is normally biased into the conducting state. The coupling network 82 between the transistor 78 output and the input of the transistor 80 takes the form of a resistor 84 connected in parallel with a condenser 86. A further resistor 88 couples the collector of the transistor 78 to the negative supply voltage —V1. A diode 89 couples the collector of the transistor 78 to the negative supply voltage —V. The output of the transistor 80 is coupled by way of the collector thereof and the condenser 90 back to the junction between the diode circuit 74 and diode 76. A resistor 92 couples the junction to a voltage +V.

In one embodiment of the invention, the clock signals appearing on the input of the buffer circuit 38 were of approximately 10 microseconds' duration. The information signals on the buffer unit 38 were of approximately 0.5 microsecond. Further the voltage +V was 15 volts, the voltage —V was —5 volts, and the voltage V1 was —15 volts. With these voltage levels present in the circuit, upon the receipt of an information or clock signal from the buffer circuit 38, the emitter of transistor 72 will fall from a ground voltage to a —5 volts. When the emitter voltage is at approximately —1 volt, the voltage at the junction between the diodes 74, the diode 76 will fall from a quiescent value of approximately +.5 volt. When the voltage reaches 0 volts, the transistor 78 will be switched to a conducting state and the transistor 80 will be switched to a nonconducting state. When the transistor 80 switches to a nonconducting state, the collector thereof will fall from a 0 to a —5 volts due to the lamp voltage derived by way of diode 91. This —5 volt change on the collector of the transistor 80 is coupled through the capacitor 90 to drive the junction voltage between the diode circuit 74 and the diode 76 down to a —4.5 volts thereby disconnecting the diode circuit 74 from the circuit. The junction voltage, upon falling to approximately a —4.4 volts, will then begin to rise exponentially toward the positive supply voltage by way of resistor 92 which functions a a pull-up resistor. If the time duration of the —5 volt signal at the emitter of the transistor 72 is 0.4 microsecond, the junction voltage will increase linearly to 0 volts in two microseconds and at this time, the transistor 78 will cut off and transistor 80 will again conduct. The 5-volt change on the collector of the transistor 80 will again be coupled through the condenser 90 to the junction to speed up the recovery of the circuit. If the time duration of the emitter signal of transistor 72 is equal to that of a clock signal or information signal at the input of the buffer circuit 38, or 10 microseconds, the junction voltage will increase from −4.6 volts to −3 volts where it will be held by the emitter of the transistor 72. On termination of the 10-microsecond input pulse, the junction voltage will rise from −3 volts back to the +0.5 volt level, or the normal D.C. voltage drop level across the diode 81, which, in a preferred embodiment, was a silicon diode.

The 0 to −5 volt signal on the collector of the transistor 80 appears on the output line 93 where it is arranged for connection to the AND gate 34, shown in FIGURE 1.

Figure 5:
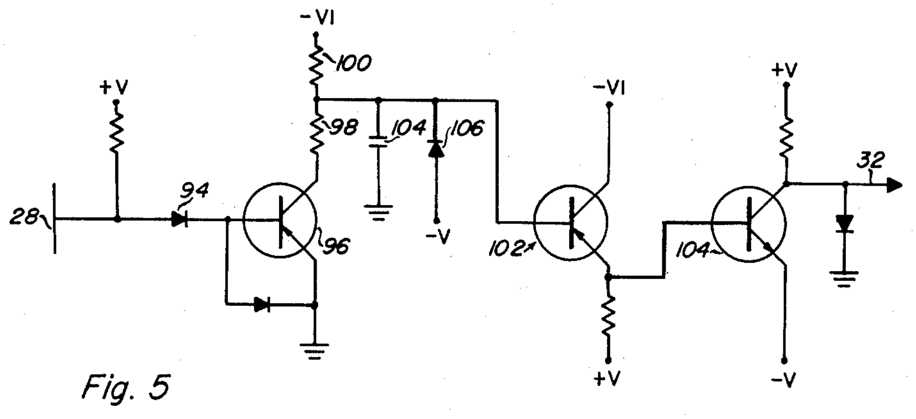
FIGURE 5 is a schematic representation of a resettable delay circuit which may be used in the present invention.

Referring next to FIGURE 5, there is here illustrated the schematic detail of one form of resettable delay circuit that may be utilized in the present invention. The input to this circuit is by way of the gating diode 94 which is connected to the base of transistor 96. The transistor 96 is connected in the grounded emitter configuration and the bias voltages that are applied thereto are such as to normally maintain the transistor cut off. Connected in series with the collector are a pair of resistors 98 and 100, these resistors serving as a connection to a negative supply voltage −V1. The junction between the resistors 98 and 100 is coupled directly to the base of an emitter-follower circuit 102. Also coupled to the junction of the resistors 98 and 100 is a condenser 104 and a clamping diode 106. Under normal operating conditions, in the absence of an input pulse, the upper terminal of the condenser 104 will be clamped to a voltage as determined by the voltage connected to the supply terminal on the diode 106. In one embodiment of the invention, this voltage was a −6 volts.

The output of the emitter-follower circuit 102 is coupled to a further transistor 104. This latter transistor is normally biased to the cut-off state under quiescent conditions. The output of transistor 104 is by way of the lead 32, the latter of which is arranged for connection to the AND gate 34, as shown in FIGURE 1.

In the foregoing circuit of FIGURE 5, upon the application of an input signal pulse representing either a clock signal or information signal on the input diode 94, the transistor 96 will be switched into a conducting state. The effect of this will be to cause the negative voltage on the upper terminal of the condenser 104 to be discharged by way of the resistor 98 and the transistor 96. The time for discharging the condenser 104 was selected, in a preferred embodiment, to be approximately 1 microsecond. With the junction between the resistors 98 and 100 being switched to substantially ground potential, the emitter-follower circuit 102 will be switched to the nonconducting state. Positive voltage will be available for application to the base of the transistor 104 so that this transistor will switch into a conducting state so that the voltage −V will be present on the output lead 32.

After the first input pulse has been received, and has terminated, the transistor 96 will no longer be biased into the conducting state. However, the voltage on the condenser 104 will begin to build up exponentially in accordance with the R–C time constant of the condenser 104 and the resistor 100. The reset time in one preferred embodiment was approximately 40 microseconds. Once the voltage has been restored to the quiescent state on the upper terminal of the condenser 104, the emitter-follower 102 will be biased back into the conducting state so that the transistor 104 will be biased into the nonconducting state. Thus, the signal on the output lead 32, with a single input pulse, will take the form of a negative-going step signal whose amplitude is −V and whose time duration will be 40 microseconds.

In the event that a further input information signal or clock signal is received by way of the input diode 94 prior to the termination of the 40-microsecond interval following the first pulse, the transistor 96 will be once again switched into the conducting state so as to discharge the charge building up on the condenser 104. This will mean that the condenser 104 will start its timing cycle over again and will maintain the circuit in the set state for a predetermined timing period which, as mentioned above in the described apparatus, was 40 microseconds. Consequently, a series of input pulses on the input diode 94 will cause the output signal on the lead 32 to remain as a negative-going step for as long as there are input pulses occurring with the time displacement between the input pulses being less than 40 microseconds, or the reset time of the circuit.

The operation of the complete record detector circuit which includes the circuits that are disclosed in FIGURES 2, 4 and 5 may best be understood by referring back to FIGURE 1. For purposes of explanation, it is first assumed that the tape 10 is moving relative to the reading head 12 so that a record stored on the tape 10 may be read. As soon as the first clock signal is sensed in the clock channel on the record tape, a signal will be passed from the sensing head 12 through the associated preamplifier circuitry 14 to the clock channel output 16. In the phase splitter, when a forward tape motion is taking place, the signal will pass through the upper portion of the phase splitter circuitry by way of the emitter-follower circuit 54 and the pulse-producing transistor 60, as shown in FIGURE 2, to the output terminal 20 where it will be available for application to the input of the AND gate 24.

Under the assumed conditions, wherein tape motion is already underway, the read forward signal RF and the read gate delay signal RGD will be effective to open the AND gate 24 so that a pulse will pass through this gate to the buffer circuit 28. The signal passing in through the buffer 28 into the resettable delay circuit will switch this circuit into the set state so that the output signal on the output line 32 will be the start of a negative-going pulse. This output indicates that a record has started. The signal will be fed back through the AND gate 34. Upon the receipt of the next clock signal or information signal, the preamplifier circuitry 14 will produce an output signal on either the lines 16 or 36.

These signals will be passed through the buffer 38 into the pulse shaper 40. A signal will then appear on the output of the shaper 40 and be applied to the AND gate 34 so that this gate will open and a signal will pass to the buffer 28 on the input of the resettable delay circuit. So long as the time interval between clock signals or between the initial clock signals and the next information signal is not greater than the time constant of the resettable delay circuit 30, the resettable delay circuit 30 will remain in the set state. This process will continue with the resettable delay circuit remaining in the set state so long as the clock and/or information signals continue to recur within the specified time interval set up in the resettable delay circuit 30.

As soon as the record being read has passed under the reading head, the clock signals as well as the information signals will cease. Consequently, in the particular embodiment described herein, 40 microseconds after the last clock or information signal has been sensed, the circuit will switch back to the reset state. There will thus be defined on the output of the circuit on the lead 32 a pulse or step signal whose time duration will be definitive of the length of the record which has been sensed by the reading head 12.

Should the reading of the record be in the reverse direction, the polarity of the initial clock signal will be reversed, as is indicated in FIGURE 3A. Notwithstanding this reversal, the output pulse as indicated in FIGURE 3B will be the same. Thus, on a read reverse operation, the phase splitter 18 will produce on the output lead 22 the necessary signal which will pass through the gate 26 and through the buffer 28 to activate the resettable delay circuit 30. The information and/or clock signals will then produce the necessary sustaining set pulses as long as they occur to define, by way of the time that the delay circuit 30 is set, the length of the record being read in the reverse direction.

It will be apparent from considering the foregoing that there has been illustrated and described a new and improved apparatus useful for accurately determining the length of a record stored in a moving record medium. Further, the circuitry has been so arranged that the definition of the record may be determined by clock signals as well as signals representing information coming from the record.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. Apparatus for sensing the length of a record of stored informational digital data and clock data on a moving multiple channel magnetic record tape comprising means sensing the presence of each data indicator in each channel on the tape, a clock data amplifier connected to receive on its input clock data representing signals from said record tape by way of said sensing means, a pulse-forming circuit connected to the output of said amplifier, a pair of gating circuits each having an input connected to an output of said pulse-forming circuit, a tape read-forward signal input connected to one input of one of said gates, a tape read-reverse signal input connected to an input of the other of said gates, a read gate delay signal input connected to an input on both of said gates, a bistable circuit adapted to be self-resetting a predetermined time following the application of an input signal, first buffering means connected to the input of said bistable circuit and to the outputs of said pair of gating means, a third gating means, data signal amplifier means connected to receive informational data from all channels except the clock channel of said tape, second buffering means connecting the output of said amplifier means to an input of said third gating means, means connecting the output of said bistable circuit to the input of said third gating means, and means connecting the output of said third gating means to the input of said first buffering means so that informational data signals may be used to set said bistable circuit once said circuit has been set by clock data signals.

2. A record detector for use with a data storage record having clock signals stored thereon and, in selected locations, data signals which are directly related to said clock signals comprising a self-resetting bistable circuit having an input and an output, an OR gate connected to said input, recording sensing means, said OR gate having at least one input connected to said record sensing means and adapted to receive clock signals therefrom, an AND gate having at least two inputs, one of which is connected to the output of said bistable circuit and the other of which is connected to said record sensing means and adapted to receive data signals therefrom, and means connecting the output of said AND gate to an input of said OR gate.

3. Apparatus for use in detecting the presence of a magnetic record on a magnetic storage tape wherein said tape has spaced magnetic clock signals and data signals stored thereon comprising tape sensing means, a self-resetting bistable circuit having an input for receiving clock signals detected on said magnetic storage tape by said tape sensing means, said self-resetting bistable circuit switching to a first state upon the occurrence of each clock signal and remaining in said first state for a predetermined time interval after receiving a clock signal, said bistable circuit having a self-resetting time constant longer than the time spacing between adjacent clock signals, gating means connected to the input of said bistable circuit, said gating means having a first input which is connected to the output of said bistable circuit, and a second input which is connected to said tape sensing means and adapted to receive said tape data signals and said tape clock signals.

4. Apparatus for detecting the presence of a record on a data storage tape wherein said tape has uniformly spaced clock signals stored along the length of each data record comprising tape sensing means, a bistable circuit having an input and an output, said bistable circuit being adapted to switch to a set state upon the occurrence of each clock signal, said bistable circuit being further adapted to revert automatically to a reset state a predetermined period of time after having been set, said reversion time being longer than the time spacing between adjacent clock signals, and means connecting the output of said bistable circuit to the input of said means connecting said tape sensing means to the input of said bistable circuit.

5. A record detector for sensing the presence of a data record on a moving data storage medium comprising a data sensing means adapted to produce output signals indicative of the presence of spaced data indications of a record stored along the length of the medium, a self-resetting bistable circuit having an input and an output, means operatively connecting said data sensing means to the input of said bistable circuit, said bistable circuit having a predetermined resetting time constant longer than the time spacing between adjacent data indications, and means connecting the output of said bistable circuit to said means for operatively connecting said sensing means to the input of said bistable circuit whereby said bistable circuit is maintained in said set state as long as data indications are sensed by said sensing means.

6. Apparatus for sensing the length of a record of stored informational digital data and clock data on a moving multiple channel magnetic record medium comprising means sensing the presence of each data indicator in each channel on the medium, a clock data amplifier connected to receive on its input data representing signals from said record medium by way of said sensing means, a pulse-forming circuit connected to the output of said amplifier, a pair of gating circuits each having an input connected to an output of said pulse-forming circuit, a read-forward signal input connected to one input of one of said gates, a read-reverse signal input connected to an input of the other of said gates, a read gate delay signal input connected to an input on both of said gates, a bistable circuit adapted to be self-resetting a predetermined time following the application of an input signal, first buffering means connected to the input of said bistable circuit and to the outputs of said pair of gating means, a third gating means, informational data signal amplifier means connected to said sensing means, second buffering means connecting the output of said amplifier means to an input of said third gating means, means connecting the output of said clock data amplifier to the input of said second buffering means, means connecting the output of said bistable circuit to the input of said third gating means, and means connecting the output of said third gating means to the input of said first buffering means so that data signals may be used to set said bistable circuit once said circuit has been set by clock data signals.

7. A record detector for use with a movable data storage record having uniformly spaced clock signals stored thereon and, in selected locations, data signals which are directly related to said clock signals comprising a self-resetting bistable circuit having an input and an output, an OR gate connected to the input to said bistable circuit, said OR gate having at least two inputs, said two inputs to said OR gate further connected to a pair of AND gates, record sensing means, means operatively connecting said record sensing means as conditioning means to each of said AND gates, a third AND gate having at least two inputs, one of said inputs to said third AND gate being connected to the output of said bistable circuit and the other of said inputs to said third AND gate being connected to said record sensing means, and means connecting the output of said third AND gate to an input of said OR gate.

8. Apparatus for sensing the length of a record of stored digital data and clock data on a moving record medium comprising means sensing the presence of each data indicator on the medium, a clock data amplifier connected to receive on its input data representing signals from said record medium by way of said sensing means, a pulse-forming circuit connected to the output of said amplifier, a pair of gating circuits each having an input connected to an output of said pulse-forming circuit, a read-forward signal input connected to one input of one of said gates, a read-reverse signal input connected to an input of the other of said gates, a read gate delay signal input connected to an input on both of said gates, a bistable circuit adapted to be self-resetting a predetermined time following the application of an input signal, buffering means connected to the input of said bistable circuit and to the outputs of said pair of gating means, a third gating means, a data signal amplifier means, means connecting the output of said amplifier to an input of said third gating means, means connecting the output of said bistable circuit to the input of said third gating means, and means connecting the output of said third gating means to the input of said buffering means so that data signals may be used to set said bistable circuit once said circuit has been set by clock data signals.

9. A record detector for sensing the presence of an informaional data record stored on a moving data storage medium wherein the record is defined at its limits by the presence of clock signals stored thereon comprising a data and clock signal sensing means adapted to produce output signals indicative of the presence of spaced data indications of a record stored along the length of the medium, a self-resetting bistable circuit having an input and an output, means connecting said bistable circuit to said sensing means, said bistable circuit having a predetermined resetting time constant longer than the time spacing between adjacent data indications, means connecting said sensing means to set said bistable circuit upon the occurrence of each clock signal sensed, means connected to said sensing means to maintain said bistable circuit set following the initial setting thereof by said clock signal, and means connecting the output of said bistable circuit to said means connected to said sensing means, and means connected to said bistable circuit to indicate that said circuit is in the set state.

10. A length of record detector for use with a movable data storage tape having clock signals uniformly stored along the length thereof adjacent data signals forming a record which is directly related to said clock signals comprising a self-resetting bistable circuit having an input and an output, an OR gate connected to record sensing means, said input, said OR gate having at least one input operatively connected to said record sensing means and adapted to receive clock signals from said record, an AND gate having at least two inputs, one of which is connected to the outputs of said bistable circuit and the other of which is operatively connected to said record sensing means, means connecting the output of said AND gate to an input of said OR gate, and a record indicator output terminal connected to said bistable circuit to represent the presence of a record when said bistable circuit is set.

11. Apparatus for sensing the length of a record on a data storage tape wherein said tape has spaced clock signals and data signals stored thereon comprising tape sensing means, a bistable circuit having an input and an output, means operatively connecting said tape sensing means to said bistable circuit, said bistable circuit being adapted to switch to a first state upon the occurrence of each clock signal and to automatically revert to a second state after a predetermined time interval, said means operatively connecting said sensing means to said bistable circuit further comprising gating means connected to the input of said bistable circuit, said gating means having at least two inputs, one of said inputs to said gating means being operatively connected to said output of said bistable circuit and another of said inputs to said gating means being operatively connected to said tape sensing means whereby said bistable circuit will switch to said first state and remain so switched upon the sensing of successive clock and data signals thereafter reverting to said second state upon the occurrence of a break in the succession of clock and data signals.

12. A record detector for sensing the length of an informational data record on a moving data storage medium comprising data sensing means adapted to produce output signals indicative of the presence of spaced data indications of a record stored along the length of said medium, a self-resetting bistable circuit having an input and an output, said bistable circuit being adapted to switch to a first state upon the occurrence of a data indication and to automatically revert to a second state after a predetermined time interval, said predetermined time interval of said bistable circuit being longer than the time spacing between adjacent data indications, input means connected to the input of said bistable circuit to switch said bistable circuit to said first state, means connecting said sensing means to the input of said bistable circuit to keep said bistable circuit from reverting to said second state so long as adjacent data indications as sensed by said sensing means occur in a time interval less than said predetermined reversion time interval of said bistable device, and means connecting the output of said bistable device to the input of said last named means.

References Cited in the file of this patent

UNITED STATES PATENTS 3,016,522 Lourie et al. ............. Jan. 9, 1962
3,088,101 Schrimpf ............. Apr. 30, 1963